2,886,511

CATALYTIC CRACKING AND IMPROVED CATALYST THEREFOR

Ross E. Van Dyke, Orinda, and John Norton Wilson, Berkeley, Calif., assignors to Shell Development Company, New York, N.Y., a corporation of Delaware No Drawing. Application January 24, 1957
Serial No. 635,952

7 Claims. (Cl. 208—119)

This invention relates to the catalytic cracking of hydrocarbon oils, to new and improved catalysts therefor, and to the preparation of such catalysts.

An object of the invention is to improve the catalytic cracking of hydrocarbon oils in the direction of producing less gas and coke and more gasoline for any given depth of conversion and especially at very high conversion levels.

The catalyst used commercially for the catalytic cracking of hydrocarbon oils is either a treated clay catalyst such as that sold under the name Filtrol or a synthetic silica-alumina composite catalyst containing from about 12 to about 25% alumina.

In composites comprising silica and alumina it is known that for a given method of preparation the activity and stability of the catalyst increase somewhat as the concentration of alumina is increased until a point is reached above which the selectivity of the catalyst falls off. In the usual method of preparation this point is around 15% $Al_2O_3$. For a number of years all of the commercial synthetic silica-alumina cracking catalysts contained about 12% $Al_2O_3$.

As shown by Ryland et al., U.S. Reissue 23,438, the alumina, when properly incorporated, does not exist as such in the catalyst but is reacted with the silica; the presence of free alumina is undesirable. The amount of alumina that can be properly combined with the silica depends very much upon the exact method of preparation, or, in other words, on the reactivity of the silica. By preparing the catalyst by the manner described in said U.S. Patent No. Reissue 23,438 it is possible to properly incorporate up to about 30% alumina thereby producing a more active and stable catalyst. Such catalyst containing about 25% alumina is now widely used in commercial practice.

Since catalytic cracking is catalyzed by the solid surface of the catalyst it has in the past been the practice to provide catalyst having the highest possible available surface per unit weight. Thus, an available surface of the fresh catalyst upwards of 400 m.$^2$/g. was considered necessary and the commercial synthetic silica-alumina composite catalysts have available surfaces of the order of 500–600 m.$^2$/g. It is now found that better results are obtained if the fresh catalyst has a relatively low available surface rather than a large available surface, provided that the selectivity is not impaired.

It is an object of the invention to provide a catalyst having a small surface generally from about 200 m.$^2$/g. up to about 400 m.$^2$/g. but high activity per unit of surface whereby the selectivity is improved. More important, however, it is an object of the invention to provide a new catalyst which when used in catalytic cracking affords an appreciable improvement in selectivity through increase in gasoline and/or decrease in the coke and gas make. These are usually considered as two manifestations of the same phenomenon. In the catalyst of the invention, however, it is found that they are distinct and separate. Thus, we have found certain formulations that increase the gasoline yield without decreasing the coke and gas, others that decrease the coke and gas made without increasing the gasoline yield, and still others that show both advantages.

It was thought that low surface catalysts of improved selectivity might be prepared by first preparing hydrous silica gel under conditions known to produce stable low surface silica gel and incorporating alumina in such hydrous silica gel by hydrolysis of an aluminum salt. Silica gels of low surface (320 m.$^2$/g.) and remarkable stability were prepared by adding ammonium hydroxide to deionized silica sols to pH 9.7 and then adding ammonium chloride to gel the silica. Silica-alumina cracking catalysts were prepared from these hydrous silica gels by hydrolyzing aluminum sulfate in the presence of the silica hydrogels prepared in this manner. The resulting catalyst however had substantially higher surfaces and poorer stability.

Further investigation into the cause of this unexpected result indicated that the aggregation of silica particles at high pH in the presence of added salt takes place by reactions which are irreversible. The mechanism is believed to be a true chemical reaction of Si—OH groups to form Si—O—Si linkages—a reaction which cannot be reversed by subsequent addition of acid or metal ions such as aluminum ions. The irreversible reaction probably occurs at high pH not only in the case of bonds involving the aggregation of the sol particles but also in the sol particles themselves. At lower pH values the aggregation of the silica also proceeds by a reversible mechanism. The failure to produce the expected catalyst by the above procedure is explained by the fact that an insufficient number of Si—O—Si linkages were formed upon aggregation of the silica particles. Then upon reaction of aluminum ions the silica particles could not coalesce on drying to form the lower surface gel which was observed with the silica itself.

These phenomena are of great significance relative to the problem of preparing improved silica-alumina cracking catalyst. It is clear that an essential and important step is in the silica hydrogel preparation itself. The silica must be aggregated to a considerable degree by the chemical reaction of Si—OH groups to form Si—O—Si bonds in the hydrogel state which cannot be reversed by subsequent change of the pH. In the process of the invention this is effected by causing the silica to aggregate in the presence of certain added salts at certain high pH values. On the other hand, the more complete the aggregation by condensation to form Si—O—Si bonds the less is the amount of alumina which can be reacted i.e., efficiently combined to produce the acidic cracking catalyst. For this reason the aggregation of the silica must be carefully controlled and alumina concentrations above those which can be efficiently reacted should be avoided.

We have found that catalysts having superior selectivity can be produced by the method hereinafter described. The main trick in this method resides in producing the silica in a form which is particularly reactive with alumina during the subsequent hydrolysis of the aluminum salt during the preparation. In outline, the first step in the preparation of the catalyst is the aggregation of silica to form a soft gel at a very high pH (10.5–11.5) by addition of a dilute solution of a water soluble magnesium or calcium salt to relatively concentrated solution e.g., 6–15% $SiO_2$, of sodium silicate e.g., Philadelphia Quartz Company E brand (pH ca 11.5). In a typical case the silica concentration at this point is approximately 5%. Acid may be added to adjust the final pH to the range of 10.0–10.5 and the material is allowed to age with stirring for a few minutes.

The aggregation of silica particles depends upon the balance between the van der Waals attractive forces which become rather large at high silica concentration and the strong repulsion of the electrical double layer. The double layer is negatively charged and exhibits a large potential in solutions of high pH. In solution of low pH the double layer is positively charged and the repulsive potential is relatively much weaker. As the pH increases above 7.0–8.0 with increasing OH$^-$ concentration the repulsive potential of the electrical double layer increases rapidly due to adsorption of OH$^-$ by the silica particles or ions or the abstraction of protons from the surface. With mixtures of sodium silicate and acid this results in a decrease in the rate of polymerization despite the higher concentration of Si—OH. This is the region of interest in the preparation of silica gels for the improved catalyst. By adsorbing the divalent magnesium or calcium cation onto a silicate ion at high concentration the repulsive negative potential is reduced and because of the strong van der Waals attractive forces the particles aggregate. The divalency of the cation permits extensive cross linking of silicate ions to which considerable amounts of sodium ion are still attached thus permitting formation of large silica particles despite the very high pH of the system. The fact that relatively large particles are formed is reflected by the quite low surface areas of the resulting catalysts. As a result of the reduction in the repulsive negative potential of the double layer, silicate ions in the gel structure are sufficiently close to each other that Si—OH condensations occur which firmly fix the structure initially induced by the cross linking of the —O—Mg—O— groups. The silica structure so obtained is considerably different from that obtained when an equivalent amount of acid is added to the silicate solution with conditions otherwise equivalent. That this is the case has been shown by the marked difference in the manner in which aluminum sulfate solution interacts during hydrolysis with the two types of sols or gels.

Following the short period of aging at pH 10.0–10.5 aluminum sulfate solution e.g., 0.4 M is added until the pH reaches a value of about 9.5. At this point ammonium hydroxide e.g., 6 M, is added simultaneously with aluminum sulfate solution to prevent the pH from dropping below 9.0 and preferably to maintain the pH at 9.5.

In some cases a salt, e.g., sodium sulfate, is added to the sodium silicate solution prior to the aggregation step with magnesium or calcium ions. The principal effect of this procedure is to decrease the bulk density or increase the pore volume of the catalyst.

The starting material for the preparation of the improved catalyst is sodium silicate. Potassium silicate can be used but is considerably more costly. The ratio of $SiO_2$ to $NaO_2$ in the sodium silicate may vary from about 1:1 up to about 4:1 but is normally between 3:1 and 4:1.

The sodium silicate is first diluted with water to a silica concentration between about 6% and about 15% by weight or to such an extent that the silica concentration just prior to incorporating the alumina is between about 3% and 9%, e.g., 5%. The pH of the diluted sodium silicate is normally about 11.5. As will be pointed out later, an ammonium salt or an alkali metal salt may be advantageously added to the silicate solution but this is not essential in all cases.

There is then added to the sodium silicate solution with stirring a dilute solution of a soluble salt of magnesium and/or calcium such, for example, as magnesium chloride, magnesium sulfate, calcium chloride, calcium nitrate, calcium acetate or a solution of one of these salts into which is dissolved some magnesium or calcium hydroxide. It is essential that the magnesium and/or calcium salt solution be added to the silicate solution or that the two solutions be added simultaneously to a mixing vessel. It is essential that the solution of the magnesium and/or calcium salt be quite dilute, preferably between 0.05 and 0.5 molar and that the pH of the silicate solution during the addition of the magnesium and/or calcium salt be maintained at a high value e.g. about 10.5 or above. The amount of magnesium and/or calcium should be in the range of $\frac{1}{60}$ to $\frac{1}{6}$ mol per mol of $SiO_2$. It should be noted that when the magnesium and/or calcium salt is added to the sodium silicate solution its effect on the pH is essentially the same as the addition of an equivalent molar quantity of sulfuric acid. The maximum amount of magnesium and/or calcium salt specified is, however, insufficient to reduce the pH below about 10.5.

Under the above conditions the magnesium and/or calcium is completely reacted in the silica aggregate. The material at this point has a pH of at least 10.0, normally contains about 5% silica by weight, and is in the form of a very soft gel (resembling waffle batter) which is thixotropic but will not set to a firm gel on standing. If the concentration of silica at this point is above about 9% a catalyst of undesirable low bulk density is produced. On the other hand, if the concentration of silica is below about 3% the bulk density generally is too high. At 5% concentration the bulk density of the catalyst is normally about 0.30 to 0.60 which is the range best suited for fluid catalyst operation.

If the pH at this point is above 10.5 it is preferably brought down to the range of 10.0 to 10.5 which can be effected by adding acid, e.g., sulfuric acid or hydrochloric acid.

In the procedure described above the magnesium and/or calcium is reacted in the silica aggregate at a very high pH after which the pH is reduced to the range of 10.0 to 10.5 by the addition of acid. In an alternative procedure the same amounts of these reagents are used but the acid is introduced prior to the magnesium and/or calcium salt solution. In this procedure the magnesium and/or calcium is reacted at a pH nearer to the value of 10.5. In a further alternative the acid and the magnesium and/or calcium salt solution may be added simultaneously. In any case, the pH of the bulk solution during the addition of the magnesium and/or calcium salt solution is not allowed to drop below about 10.0 for any appreciable time and preferably not below 10.5.

The creamy material may be stirred for a few minutes, e.g., 15 minutes, to insure equilibrium.

In the preferred procedure a solution of aluminum salt is slowly added with stirring to the creamy silica (pH 10.0 to 10.5) until the pH is reduced to about 9.5. Additional aluminum salt solution and ammonium hydroxide are then added at such a rate as to maintain the pH at this value until all of the alumina to be incorporated has been added.

The pH at which the hydrolysis of the aluminum salt is carried out is quite critical. The preferred value is 9.5. The pH may, however, vary somewhat, e.g., 0.5 unit, from this value. Higher pH's, e.g. up to 10.5 can be used but at pH above 10.0 the resulting catalyst is found to contain large amounts of bonded sodium which is difficult to remove without affecting the properties of the catalyst. On the other hand, at pH's below 9.0 the magnesium and/or calcium is largely removed from the catalyst. The catalyst produced by the above procedure not only produces less coke and more gasoline than conventional silica-alumina catalyst but it also produces significantly better yields of valuable $C_3$ and $C_4$ olefins. In this procedure most, but not all, of the silica is aggregated prior to incorporating the alumina and the remaining silica is aggregated with the alumina.

The pH of the silica may be brought down to the 9.5 value by the addition of acid prior to incorporating the alumina. The aluminum salt solution is then added along with ammonium hydroxide while maintaining the pH at the stated value as described above. In this case, the silica is essentially all aggregated prior to incorporating the alumina.

The amount of aluminum incorporated in the catalyst may be as high as about 35% by weight, calculated as $Al_2O_3$ and based on the finished catalyst, but is preferably in the range downward of 30%, e.g. 12–30%. Lesser amounts down to 1% can be used but when lesser amounts are incorporated it is found that the catalyst tends to retain sodium which is difficult to remove.

The amounts of magnesium and/or calcium specified above are equivalent to about 1% to 9% by weight calculated as MgO and CaO based on the finished catalyst containing about 20% $Al_2O_3$. The improved gasoline yield and reduction of coke make is not strongly dependent on the concentration of magnesium and/or calcium used in the ranges specified. However, to obtain, in addition, the increased yield of valuable $C_3$ and $C_4$ olefins it is essential that at least about 3% MgO and/or CaO be retained in the catalyst.

As previously stated, it is advantageous to add an ammonium salt or alkali metal salt, e.g. the chloride or sulfate, to the sodium silicate solution prior to incorporating the magnesium and/or calcium. This addition is particularly advantageous when the sodium silicate used has a high ratio of $SiO_2$ to $Na_2O$, e.g. above 3. The salt may be dissolved in the sodium silicate solution in any concentration up to about 0.1 mole per mole of $SiO_2$.

After aggregating the silica and combining the alumina as described the hydrous product is filtered, washed and dried. It is desirable to wash the catalyst with an ammonium salt solution e.g. the nitrate, chloride, or acetate, at a high pH, e.g. 9.5, to remove sodium salts. This may be done prior to drying the catalyst or after drying.

The material may be dried and then ground or formed into pieces of the desired size and shape for fixed bed or moving bed operation, or it may be spray dried to produce a microspheroidal powder suitable for use with the fluidized catalyst technique. Prior to using the catalyst it is preferably, but not necessarily, calcined to reduce the moisture content down to a value of 15% or somewhat below this figure.

The catalyst of the invention does not have the adverse electrostatic properties of the proprietary silica-magnesia cracking catalyst and consequently it is easily fluidized. It can, of course, be used alone but because of its better fluidization properties it is particularly suited for use in admixture with natural clay catalyst or the conventional synthetic silica-alumina catalyst.

The catalyst of the invention is useful for the cracking of all types of hydrocarbon oils commonly used as catalytic cracking feed stocks. It is especially advantageous for the catalytic cracking of very heavy hydrocarbon oils having molecular weight above 300, and especially when cracking to higher than usual conversion levels e.g. 60% or above. Conversion is defined as 100 minus the percent of recovered oil boiling above 450° F.

The catalytic cracking may be carried out by contacting the vapors of the oil to be cracked in a suitable catalytic cracking reactor with the catalyst at temperatures from about 850 to about 1050° F. and pressure from about 1 to 4 atm. abs.

EXAMPLE 1

A quantity (516 g.) of sodium silicate of the ratio 3.2 $SiO_2/Na_2O$ and containing 29.1% $SiO_2$ was diluted to 2.5 liters. A solution of magnesium sulfate was prepared by dissolving 81.9 g. $MgSO_4 \cdot 7H_2O$ in 500 ml. water. This 0.664 M solution was equal to 0.13 mole Mg/mole $SiO_2$. This magnesium sulfate solution was added to the sodium silicate solution with stirring over a period of about 20 minutes at approximately room temperature. The pH of the resulting slurry was reduced to 10.45 by the addition of 32 ml. of 6.1 N $H_2SO_4$ and the slurry was stirred for 45 minutes. The material at this stage was a soft gel of approximately the consistency of waffle batter. A 1.02 M solution of aluminum sulfate was prepared and 0.361 liter of this solution was diluted to 0.92 liter. The pH of the gel was then reduced to 9.5 by addition of this dilute aluminum sulfate solution which required 0.276 liter. At this point the addition of 6 M ammonium hydroxide was begun simultaneously with the remainder of the aluminum sulfate solution at a rate to maintain the pH at 9.4–9.5. The resulting silica-alumina-magnesia composite was filtered from the mother liquor, washed with water, further washed with 0.2 M ammonium nitrate solution at pH 9.5, further washed with water and then dried and calcined 4 hours at 565° C. The resulting catalyst contained 6% MgO, 19% $Al_2O_3$, the balance being silica. The available surface area was 308 m.$^2$/g. and the pore volume was 0.56 cc./gm.

EXAMPLE 2

A quantity of sodium silicate (516 g.) having the ratio 3.2 $SiO_2/Na_2O$ and containing 29.1% $SiO_2$ was diluted to 2.5 liters. A 0.541 M solution of calcium chloride was prepared by dissolving 30 g. anhydrous $CaCl_2$ in 500 ml. water. This calcium chloride solution containing 0.11 mole Ca per mole $SiO_2$ was added over a period of 20 minutes with stirring to the diluted sodium silicate solution. The pH of the resulting slurry was then reduced to 10.5 by the addition of 46 ml. of 6.1 N $H_2SO_4$. This slurry was stirred for 45 minutes at essentially room temperature. A 0.4 M aluminum sulfate solution (0.92 liter) containing 0.16 mole $Al_2O_3$ per mole $SiO_2$ was prepared. The pH of the slurry was reduced to 9.5 by the addition of part of this aluminum sulfate solution, the amount required being 0.29 liter. Ammonium hydroxide solution (6 M) was then added simultaneously with the remainder of the aluminum sulfate solution at a rate to maintain the pH at 9.4–9.5. The resulting gel was filtered, washed with water, washed with 0.2 M ammonium nitrate at pH 9.5, again washed with water, dried and calcined at 565° C. for 4 hours.

The resulting catalyst contained 4.3% CaO, 19% $Al_2O_3$, the balance being $SiO_2$. Its available surface area was 277 m.$^2$/g. and its pore volume was 0.78 cc./g. The discrepancy between the amount of calcium used in the preparation and the amount of calcium in the finished catalyst is due to the removal of part of the calcium by solution during the time that the medium was at a pH of 9.5.

EXAMPLE 3

A quantity (516 g.) of sodium silcate having the ratio 3.2 $SiO_2/Na_2O$ and containing 29.1% $SiO_2$ was diluted to 1.5 liters with water. To this solution there was added 140 ml. of a 1 M solution of $Na_2SO_4$. A dilute (0.2026 M) solution of magnesium sulfate was prepared in an amount (1.5 liters) equal to 0.12 mole/mole $SiO_2$. This magnesium sulfate solution was added to the solution of silicate and sodium sulfate with stirring at essentially room temperature over a period of 20 minutes. The stirring was then continued for a further 10 minutes to ensure completion of the reaction. The pH of the mixture was then reduced to 10.5 through the addition of 22 ml. of 6.1 N $H_2SO_4$. A solution of aluminum sulfate was prepared in an amount equal to 0.16 mole/mole $SiO_2$ or 0.995 liter of 0.4 M aluminum sulfate. The pH of the mixture was then reduced to 9.5 by the addition of part of this aluminum sulfate solution, the amount required being .207 liter. Ammonium hydroxide solution (6 M) was then added along with the remainder of the aluminum sulfate solution at a rate to maitnain the pH at 9.5–9.55. The resulting gel was filtered, washed with water, further washed with 0.5 M ammonium nitrate solution at pH 9.5 further washed with water, dried and calcined for 4 hours at 565° C.

The resulting catalyst contained 4.5% MgO, 19% $Al_2O_3$, the remainder being $SiO_2$. The surface area and pore volume were respectively 315 m.$^2$/g. and 0.52 cc./g.

EXAMPLE 4

A quantity of sodium silicate (1100 g.) having the ratio 3.2 $SiO_2/Na_2O$ and containing 27.3% $SiO_2$ was diluted with water to 2.4 liters. A quantity (292 ml.) of 1 M magnesium sulfate was diluted to 3.6 liters. This diluted magnesium sulfate solution was added to the diluted sodium silicate solution with stirring at essentially room temperature over a period of 45 minutes. The pH of the resulting slurry was then reduced to about 10.5 through the addition of 196 ml. of 6.1 N $H_2SO_4$ and the slurry was allowed to age at this pH for one hour. The pH of the slurry was then reduced to 9.5 by the addition with stirring of 70 ml. of 0.97 M aluminum sulfate solution. Ammonium hydroxide was then added simultaneously with a further quantity (533 ml.) of the 0.97 M aluminum sulfate solution at a rate to maintain the pH at 9.35-9.5. The resulting gel was filtered, washed with water, washed with 0.5 M ammonium nitrate at pH 0.5, further washed with water, dried and calcined at 565° C. for 4 hours.

The resulting catalyst contained 2.2% MgO and 17% $Al_2O_3$, the balance being $SiO_2$. Its available surface area was 310 m.$^2$/g.

The above catalysts were each steamed under 1 atm. steam pressure for 20 hours at 576° C., in order to simulate a short period of use under practical operating conditions, and they were then used for the catalytic cracking of a commercial West Texas flashed distillate having a molecular weight of 319 at 500° C., 1 atm. pressure and a 60 minute process period. A pretreatment such as that here given is considered desirable before testing a cracking catalyst since it is found that the properties of all fresh cracking catalysts are drastically altered even during the first few hours of commercial use and the behavior of the freshly prepared and nonpretreated catalyst bears little relation to its behavior in commercial application.

The standard used for comparison is a commercial silica-alumina cracking catalyst which is widely used. It is of the newer so-called high alumina type containing about 25% $Al_2O_3$. The surface area when fresh was about 515 m.$^2$/g. The standard catalyst as freshly received was subjected to the same above-described preliminary steaming treatment.

The results are shown in the following Table 1.

*Table 1*

| Catalyst | Ex. 1 | Ex. 1 | Ex. 2 | Ex. 3 | Ex. 4 |
|---|---|---|---|---|---|
| WHSV | 2.35 | 1.61 | 2.32 | 1.62 | 2.33 |
| Percent Reacted | 53.6 | 60.2 | 52.6 | 60.9 | 56.9 |
| Products, percent wt.: | | | | | |
| gas | 17.3 | 21.7 | 18.9 | 22.8 | 20.3 |
| gasoline | 34.9 | 36.1 | 33.3 | 35.3 | 34.4 |
| $C_3+C_4$ olefins | 9.3 | 11.3 | 10.0 | 11.5 | 10.4 |
| coke | 1.40 | 2.36 | 1.35 | 2.81 | 2.19 |
| Relative gasoline | 106 | 107 | 102 | 105 | 103 |
| Relative $C_3+C_4$ olefins | 95 | 105 | 105 | 106 | 100 |
| Relative coke | 65 | 67 | 68 | 76 | 80 |
| Relative activity | 112 | 115 | 106 | 104 | 105 |

The figures of primary interest are the relative yields and activities shown in the lower part of the above table. These figures show the yields of gasoline, $C_3+C_4$ olefins and coke obtained with these catalysts relative to the corresponding yields of these products obtained with the standard catalyst at the same conversion level, the standard catalyst being in each case assigned a yield rating of 100. The relative activities are on a liquid hourly space velocity basis and indicate the relative amount of cracking catalyzed by a unit of catalyst surface, the standard catalyst being assigned a rating of 100.

It will be noted that in all cases the amount of coke produced was only 65 to 80% of that produced by the standard catalyst at the same conversion level. The amount of gasoline produced was, on the other hand, in all cases significantly higher. The amount of valuable $C_3$ and $C_4$ olefins was in general significantly higher, especially at the higher conversion levels.

The importance of these improved results which are clearly outside of experimental error will be appreciated when it is considered that in this field it takes a very little percentage improvement to afford a large monetary gain. For example, for a major oil company having a catalytic cracking capacity of 200,000 b./d. and using 50 tons a day of fresh cracking catalyst costing $300/ton, an increase in the value of the catalytic cracking products by as little as one cent per barrel of feed represents an improvement worth $2,000 per day, and a decrease in the cost and/or amount of catalyst by 10% represents a saving of $1,500 per day. With the catalyst of Example 1 and at equal conversion calculations indicate an increase in product value of about 10¢/bbl. of cracker feed, and on the basis of equal coke production (conversions differing) the indicated increase in product value is about 17¢/bbl. of cracker feed.

In addition to the improvements afforded in the catalytic cracking itself it should be noted that the catalyst preparation method allows the use of relatively concentrated solutions of sodium silicate and very substantially reduces the consumption of the sulfuric acid.

We claim as our invention:

1. In the process for the catalytic cracking of a hydrocarbon oil to produce catalytically cracked gasoline and $C_3$ and $C_4$ olefins the improvement which comprises contacting the hydrocarbon oil to be cracked in the vapor phase at a temperature between 850° F. and 1050° F. and a pressure from 1 to 4 atmosphere absolute with a solid catalyst prepared by reacting at a pH maintained at a value of at least 10.0 with a sodium silicate solution containing between about 6% and 15% of $SiO_2$, a dilute solution of a water soluble salt of a metal selected from the group consisting of magnesium, calcium, and mixture thereof, said dilute solution being from about 0.05 to 0.5 molar and being in an amount to supply from about 1/50 to 1/5 mole of the metal salt per mole of $SiO_2$, bringing the pH of the reaction mixture to a value in the range of 10.0 to 10.5, then adding to said reaction mixture a solution of a water soluble salt of aluminum in an amount to incorporate between 12 and 30% $Al_2O_3$ based on the calcined catalyst and adding ammonium hydroxide during the addition of said aluminum salt solution at a rate adjusted to prevent the pH of the reaction mixture from dropping below 9.0, then filtering, washing and calcining the resulting hydrogel.

2. In the process for the catalytic cracking of a hydrocarbon oil to produce catalytically cracked gasoline and $C_3$ and $C_4$ olefins the improvement which comprises contacting the hydrocarbon oil to be cracked in the vapor phase at a temperature between 850° F. and 1050° F. and a pressure from 1 to 4 atmospheres absolute with a solid catalyst prepared by reacting at a pH maintained at a value of at least 10.5 with a sodium silicate solution having a mole ratio of $SiO_2$ to $Na_2O$ between about 3 and 4 and containing between about 6% and 15% of $SiO_2$ a dilute solution of a water soluble salt of a metal selected from the group consisting of magnesium, calcium, and mixture thereof, said dilute solution being from about 0.05 to 0.5 molar and being in an amount to supply from about 1/50 to 1/5 mole of the metal salt per mole of $SiO_2$, the reaction mixture at this point being a creamy gel containing about 5% $SiO_2$, then reducing the pH of the reaction mixture to a value in the range of 10.0 to 10.5, then adding to said reaction mixture a solution of a water soluble salt of aluminum in an amount to incorporate between 12 and 30% $Al_2O_3$ based on the calcined catalyst and adding ammonium hydroxide during the addition of said aluminum salt solution at a rate adjusted to maintain the pH of the reaction mixture at 9.5±0.5, then filtering, washing and calcining the resulting hydrogel.

3. In the process for the catalytic cracking of a hydrocarbon oil to produce catalytically cracked gasoline and $C_3$ and $C_4$ olefins the improvement which comprises contacting the hydrocarbon oil to be reacted in a vapor phase at a temperature between 850° F. and 1050° F. at a pressure of 1 to 4 atm. abs. with a solid catalyst prepared by preparing a solution of sodium silicate having a concentration of $SiO_2$ between about 6% and 15%; adding to said sodium silicate solution a positive amount less than 0.1 mole/mole of $SiO_2$ of a salt selected from the group consisting of the water soluble salts of sodium and ammonium; reacting with the resulting mixture while maintaining the pH at a value of at least 10.5 a dilute solution of a water soluble salt of a metal selected from the group consisting of magnesium, calicum, and mixtures thereof, said dilute solution being from 0.05 to 0.5 molar and being in an amount to supply from about $\frac{1}{60}$ to $\frac{1}{5}$ mole of the metal salt per mole of $SiO_2$ in the sodium silicate solution; after combining the said solutions bringing the pH of the resulting liquid to a value within the range of about 10.0 to 10.5; then adding to said liquid a solution of a water soluble salt of aluminum in an amount to incorporate about 20% $Al_2O_3$ based on the calcined catalyst, and adding ammonium hydroxide during the last said addition at a rate adjusted to maintain the pH of the liquid at 9.5±0.5; filtering the resultant hydrogel from the liquid and washing, drying and calcining the same.

4. Process for the production of a catalyst having pronounced activity for the cracking of hydrocarbon oils with low formation of coke which comprises preparing a solution of sodium silicate having a concentration of $SiO_2$ between about 6% and 15%, reacting with said sodium silicate solution while maintaining the pH at a value of at least 10.0 a dilute solution of a water soluble salt of a metal selected from the group consisting of magnesium, calcium, and mixtures thereof, said dilute solution being from about 0.05 to 0.5 molar and being in an amount to supply from about $\frac{1}{60}$ to $\frac{1}{5}$ mole of the metal salt per mole of $SiO_2$ in the sodium silicate solution; after combining the said solutions bringing the pH of the resulting liquid to a value within the range of about 10.0 to 10.5; then adding to said liquid a solution of a water soluble salt of aluminum in an amount to incorporate between 12 and 30% $Al_2O_3$ based on the calcined catalyst, and adding ammonium hydroxide during the last said addition at a rate adjusted to prevent the pH of the liquid from dropping below 9.0; filtering the resultant hydrogel from the liquid and washing, drying and calcining the same.

5. Process for the production of a catalyst having pronounced activity for the cracking of hydrocarbon oils with low formation of coke which comprises preparing a solution of sodium silicate having a concentration of $SiO_2$ between about 6% and 15%, reacting with said sodium silicate solution while maintaining the pH at a value of at least 10.5 a dilute solution of a water soluble salt of a metal selected from the group consisting of magnesium, calcium, and mixtures thereof, said dilute solution being from about 0.05 to 0.5 molar and being in an amount to supply from about $\frac{1}{60}$ to $\frac{1}{5}$ mole of the metal salt per mole of $SiO_2$ in the sodium silicate solution; after combining the said solutions bringing the pH of the resulting liquid to a value within the range of about 10.0 to 10.5, the reaction mixture at this point being a creamy gel containing about 5% $SiO_2$; then adding to said liquid a solution of a water soluble salt of aluminum in an amount to incorporate about 20% $Al_2O_3$ based on the calcined catalyst, and adding ammonium hydroxide during the last said addition at a rate adjusted to maintain the pH of the liquid at 9.5±0.5; filtering the resultant hydrogel from the liquid and washing and calcining the same.

6. A catalyst having pronounced activity for the cracking of hydrocarbon oils with low coke formation prepared by adding at a pH maintained at a value of at least 10.5 to a sodium silicate solution containing between about 6% and 15% of $SiO_2$ a dilute solution of a water soluble salt of a metal selected from the group consisting of magnesium, calicum, and mixture thereof, said dilute solution being from about 0.05 to 0.5 molar and being in an amount to supply from about $\frac{1}{60}$ to $\frac{1}{5}$ mole of the metal salt per mole of $SiO_2$, bringing the pH of the mixture to a value in the range of 10.0 to 10.5, then adding to said mixture a solution of a water soluble salt of aluminum in an amount to incorporate between 12 and 30% $Al_2O_3$ based on the calcined catalyst and adding ammonium hydroxide during the addition of said aluminum salt solution at a rate adjusted to prevent the pH of the reaction mixture from dropping below 9.0, then filtering, washing and calcining the resulting hydrogel, said catalyst being further characterized by having an available surface below 400 m.²/g. and a bulk density between about 0.30 and 0.60 g./cc.

7. A catalyst having pronounced activity for the cracking of hydrocarbon oils with low coke formation prepared by reacting at a pH maintained at a value of at least 10.5 with a sodium silicate solution containing between about 6% and 15% of $SiO_2$ a dilute solution of a water soluble salt of a metal selected from the group consisting of magnesium, calicum, and mixture thereof, said dilute solution being from about 0.5 to 0.5 molar and being in an amount to supply from about $\frac{1}{60}$ to $\frac{1}{5}$ mole of the metal salt per mole of $SiO_2$, then reducing the pH of the reaction mixture to a value in the range of 10.0 to 10.5, the reaction mixture at this point being a creamy gel containing about 5% $SiO_2$; then adding to said reaction mixture a solution of a water soluble salt of aluminum in an amount to incorporate between 12 and 30% $Al_2O_3$ based on the calcined catalyst and adding ammonium hydroxide during the addition of said aluminum salt solution at a rate adjusted to maintain the pH of the reaction mixture at 9.5±0.5, then filtering, washing and calcining the resulting hydrogel, said catalyst being further characterized by having an available surface below 400 m.²/g. and a bulk density between about 0.30 and 0.60 g./cc.

References Cited in the file of this patent

UNITED STATES PATENTS

| | | |
|---|---|---|
| 2,472,830 | Hunter | June 14, 1949 |
| 2,472,834 | Schexnailder et al. | June 14, 1949 |